(No Model.)
E. E. DELAND.
SHEPHERD'S CROOK.
No. 275,161. Patented Apr. 3, 1883.
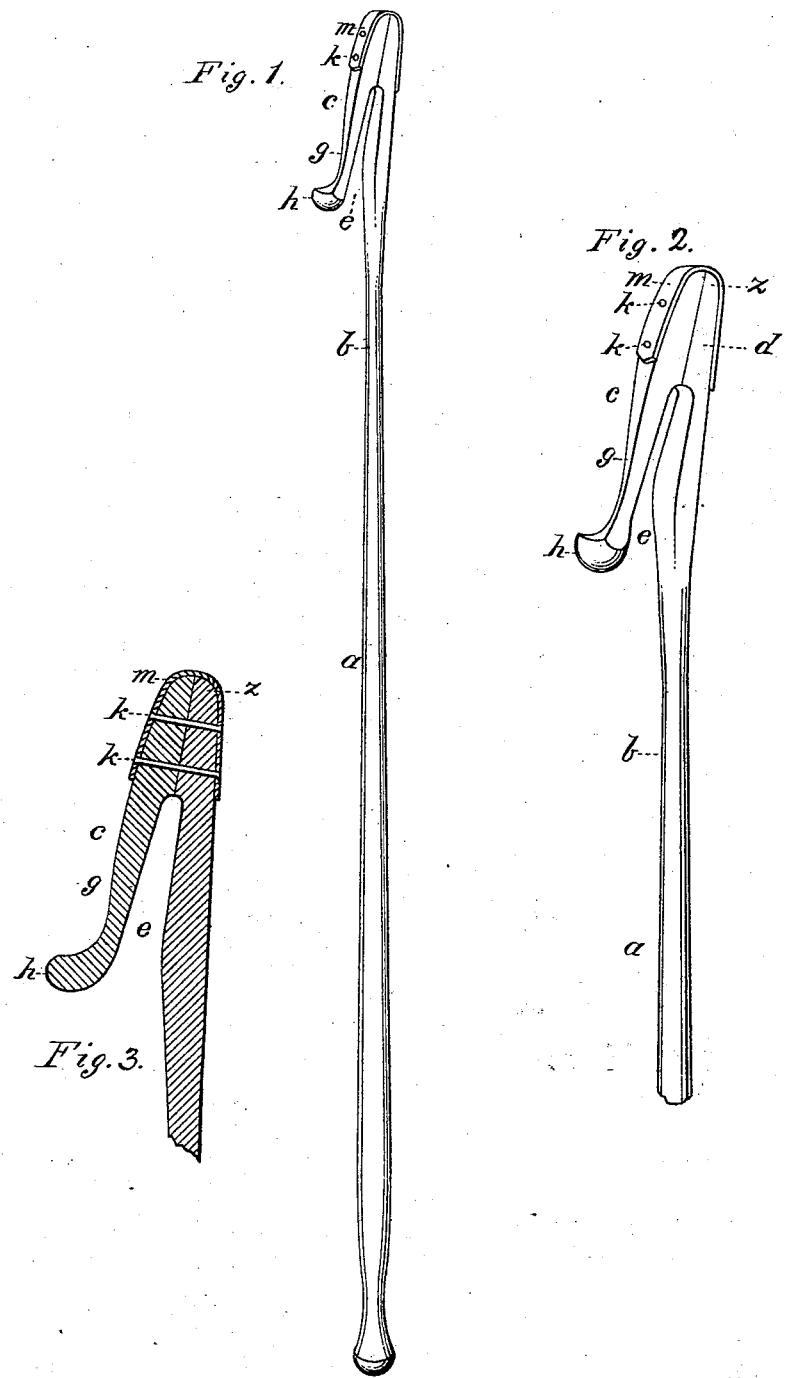

UNITED STATES PATENT OFFICE.

EDWARD E. DELAND, OF BRADY, TEXAS.

SHEPHERD'S CROOK.

SPECIFICATION forming part of Letters Patent No. 275,161, dated April 3, 1883.

Application filed July 15, 1882. (No model.)

*To all whom it may concern:*

Be it known that I, EDWARD E. DELAND, a citizen of the United States, and a resident of Brady, in the county of McCulloch and State of Texas, have invented a new and valuable Improvement in Shepherds' Crooks; and I do hereby declare that the following is a full, clear, and exact description of the construction and operation of the same, reference being had to the annexed drawings, making a part of this specification, and to the letters and figures of reference marked thereon.

Figure 1 is a perspective view. Fig. 2 is an enlarged perspective view of a part thereof, and Fig. 3 is a sectional detail view.

This invention has relation to shepherds' crooks; and it consists in the construction and novel arrangement of the tapering and balanced staff, the slender neck near the head or crook, the broad bearings of the crook, and the guard-knob on the end thereof.

The invention also consists in constructing the head in two parts, riveted together, and provided with a metallic guard strip or tire, all as hereinafter set forth.

In the annexed drawings, the letter $a$ designates the staff or handle of the crook, which is made slender and flexible at $b$ near the head or crook $c$, so that it can be balanced easily in the hand, the weight being massed near the hand of the shepherd. The flexibility of the staff near the crook is designed to provide for some yielding to the movements of the sheep when caught by the leg in the crook in its struggles to the right and left. The head or crook $c$ is formed with broad bearings on its sides at $d$ and in the cleft $e$, which are provided in order to prevent injury to the sheep when said bearings are brought in contact with the animal's leg; and, as the shepherd's aim is not always sure, in order to avoid injury to the sheep when it is struck in the flank the end of the reversed portion $g$ of the head or crook is formed with an outwardly-turned rounded knob, $h$, as indicated in the drawings. The reversed portion $g$ of the head $c$ is constructed separately and riveted to the end of the staff, as at $k$, a tire strip or guard, $m$, secured thereto by bolts being used for this purpose. This tire-strip protects and strengthens the joint, preserves the end of the head from wear, and prevents the wood from splintering in this part and rendering the crook unfit for use. Besides, the broad bearings serve to prevent injury to the sheep to a considerable degree when handling the crook.

An implement for catching hogs, consisting of a handle provided with a rod or lever and a pivoted sliding hook that is fastened to said rod, has been used prior to my invention. A shepherd's crook having the crook of rounded form has had the reverse end of the crook provided with a rounded knob, and neither of these constructions are claimed broadly herein.

Having described this invention, what I claim, and desire to secure by Letters Patent, is—

1. A shepherd's crook having a tapering and balanced staff, a slender neck near the head, broad bearings on the sides of the head and in the crook-cleft, and an outwardly-turned rounded guard-knob on the end of the reversed portion of the crook, substantially as specified.

2. A shepherd's crook having a flexible neck portion and broad head formed of two parts riveted together and provided with a metallic guard strip or tire, substantially as specified.

In testimony that I claim the above I have hereunto subscribed my name in the presence two witnesses.

EDWARD E. DELAND.

Witnesses:
BENJAMIN HENTON,
WELLINGTON McSHAN.